(12) United States Patent
Casper et al.

(10) Patent No.: US 10,766,702 B2
(45) Date of Patent: Sep. 8, 2020

(54) MODULAR CHUTE FOR THE TRANSPORT OF ARTICLES

(71) Applicant: Talos Engineered Products, LLC, Franklin, TN (US)

(72) Inventors: Zachary Casper, Franklin, TN (US); Jathan Richard, Franklin, TN (US); Gerrit Hale, Franklin, TN (US); Dewayne Sullivan, Franklin, TN (US); Matt Harvey, Franklin, TN (US)

(73) Assignee: TALOS ENGINEERED PRODUCTS, LLC, Franklin, TN (US)

( * ) Notice: Subject to any disclaimer, the term of this patent is extended or adjusted under 35 U.S.C. 154(b) by 0 days.

(21) Appl. No.: 16/377,015

(22) Filed: Apr. 5, 2019

(65) Prior Publication Data
US 2019/0308813 A1      Oct. 10, 2019

Related U.S. Application Data

(60) Provisional application No. 62/725,799, filed on Aug. 31, 2018, provisional application No. 62/654,421, filed on Apr. 7, 2018.

(51) Int. Cl.
*B65G 11/06*   (2006.01)
*B65G 21/08*   (2006.01)

(52) U.S. Cl.
CPC ............ *B65G 11/063* (2013.01); *B65G 11/06* (2013.01); *B65G 21/08* (2013.01)

(58) Field of Classification Search
CPC ..... B65G 11/06; B65G 11/063; B65G 11/066; B65G 21/18; B65G 2207/24

USPC ............................................ 193/12; 198/778
See application file for complete search history.

(56) References Cited

U.S. PATENT DOCUMENTS

| | | | |
|---|---|---|---|
| 1,312,995 A | | 8/1919 | Lister |
| 1,515,890 A | * | 11/1924 | Sekulski Lee E ... B65G 11/063 193/12 |
| 1,515,965 A | * | 11/1924 | Frank Pardee ......... B07B 13/11 209/697 |
| 2,204,828 A | | 6/1940 | Sherrill |
| 2,437,259 A | | 3/1948 | Kautz |
| 2,708,995 A | | 5/1955 | Saliba |
| 3,280,993 A | † | 10/1966 | Wolfe |
| 3,565,226 A | * | 2/1971 | Winchester .......... B65G 11/063 193/12 |
| 4,858,750 A | | 8/1989 | Cawley |
| 5,141,102 A | | 8/1992 | Roinestad et al. |
| 5,154,488 A | † | 10/1992 | Maxon |
| 5,209,323 A | † | 5/1993 | Hopkins |
| 5,598,914 A | * | 2/1997 | Sulzer .................. B65G 11/203 193/12 |

(Continued)

OTHER PUBLICATIONS

Mowery, Nelson, Centrifugal Coal Separator, U.S. Pat. No. 964,444 issued Jul. 12, 1910.

*Primary Examiner* — James R Bidwell
(74) *Attorney, Agent, or Firm* — Allen, Dyer et al.

(57) ABSTRACT

An improved modular chute comprising a stanchion comprising a plurality of rib connection points; a plurality of rib assemblies extending from the stanchion, each of the rib assemblies comprising at least a first rib, a second rib, and a tie rod connecting the first rib to the second rib; and a lining disposed within one or more of the rib assemblies, wherein the lining comprises a plurality of lining sections.

27 Claims, 9 Drawing Sheets

(56) References Cited

U.S. PATENT DOCUMENTS

| | | |
|---|---|---|
| 6,609,607 B2 † | 8/2003 | Woltjer |
| 7,581,629 B2 † | 9/2009 | Kohler |
| 8,733,529 B2 † | 5/2014 | Heddles |
| 9,751,693 B1 | 9/2017 | Battles et al. |
| 10,040,642 B2 | 8/2018 | Gorski |
| 10,217,074 B1 | 2/2019 | Stallman et al. |
| 2006/0021847 A1 | 2/2006 | Sanchez et al. |
| 2011/0002761 A1 | 1/2011 | Aimable-Lima et al. |
| 2017/0173645 A1 | 6/2017 | Hashimoto |

\* cited by examiner
† cited by third party

MODULAR CHUTE FOR THE TRANSPORT OF ARTICLES

CROSS-REFERENCES TO RELATED APPLICATIONS

This Application claims priority to and incorporates fully be reference U.S. Provisional Application No. 62/654,421, Modular Chute for the Transport of Articles, filed Apr. 7, 2018, and U.S. Provisional Application No. 62/725,799, Modular Chute for the Transport of Articles, filed Aug. 31, 2018.

STATEMENT REGARDING FEDERALLY SPONSORED RESEARCH OR DEVELOPMENT

Not applicable.

BACKGROUND

Chutes are well-known devices for the transport of articles from a first location to another location. Commonly, articles in the chute move from an upper location to a lower location by sliding down the chute via the force of gravity. Some chutes may also provide for mechanical or human assistance in applying the necessary force to transport articles down the chute. It is further common for spiral type chutes to rotate downwardly to a selected rotational degree.

Chutes known to the art are commonly constructed of metal, fiberglass, wood, polymer, or any combination thereof. However, chutes known to the art suffer a number of disadvantages. Fiberglass and polymer chutes often must be created from molds. Such molds are expensive and can only be used to create exact duplicates of the mold. Additionally, molds cannot be readily adapted to accommodate desired changes in the chute structure.

Metal chutes are typically constructed from steel components that must be prefabricated by welding each component together. When a component fails or is damaged, repairs are expensive and time consuming. Repairs commonly require cutting or removal of one or more of the components. In many cases, the entire chute must be removed to make repairs. The chute must also be re-welded after repairs are finished. While metal chutes may often accommodate heavier articles, such chutes are often heavy and, therefore, expensive and difficult to install, remove, or modify in any manner. Further, prefabricated metal chutes are difficult and expensive to ship to a desired location.

It would be advantageous for an improved chute to be readily assembled and disassembled for timely and cost-efficient transportation and installation of the chute. It would also be advantageous for the chute to be readily repairable and to accommodate easy replacement of any portion or component of the chute. Further, it would be advantageous for an improved chute to be readily adaptable to a desired size, slope, and rotational degree.

SUMMARY

The present invention is directed to an improved modular chute for the transportation of articles. Embodiments of the present invention offer greater modularity and will provide substantially cheaper and faster assembly, disassembly, repairs, and modification than devices known to the prior art.

Generally, embodiments of the present invention comprise a modular chute for the transportation of articles from a first location to a desired second location. The modular chute generally comprises a stanchion comprising a plurality of rib connection points; a plurality of rib assemblies extending from the stanchion, each of the rib assemblies comprising at least a first rib, a second rib, and a tie rod connecting the first rib to the second rib; and a lining disposed within one or more of the rib assemblies, wherein the lining comprises a plurality of lining sections. Further, each of the ribs generally comprises a first end portion comprising a tie rod mounting point and a second end portion comprising a connection member.

Alternative embodiments of the present invention generally comprise a modular chute for the transportation of articles from a first location to a desired second location wherein the modular chute comprises an infeed mounting portion and a discharge mounting portion to provide structural support to the chute. The modular chute generally comprises a plurality of rib assemblies disposed between the infeed mounting portion and the discharge mounting portion, each of the rib assemblies comprising at least a first rib, a second rib, and a tie rod connecting the first rib to the second rib; a lining disposed within one or more of the rib assemblies, wherein the lining comprises a plurality of lining sections; and an inner radius guard and an inner radius support, wherein the inner radius support comprises a plurality of support sections and the inner radius guard comprises a plurality of guard sections. Each of the ribs generally comprises a first end portion comprising a tie rod mounting point and a second end portion comprising a connection member. Further, each of the support sections is removably coupled to at least one connection member, and each of the guard sections is removably coupled to at least one of the support sections.

BRIEF DESCRIPTION OF THE DRAWINGS

These and other features, aspects, and advantages of the present invention will become better understood with regard to the following description and accompanying drawings, wherein.

DETAILED DESCRIPTION

Figure 1:
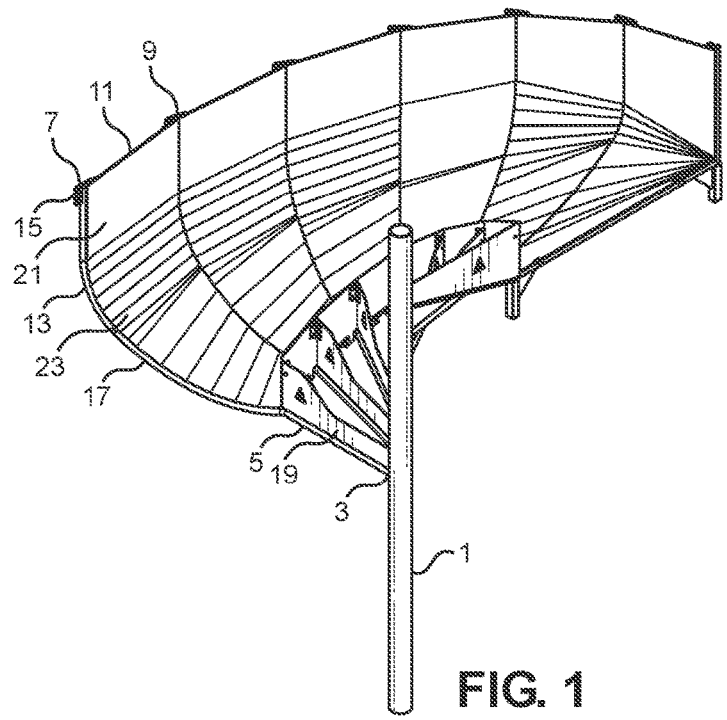
FIG. 1 shows a perspective view of an embodiment of the present invention.
Figure 2:
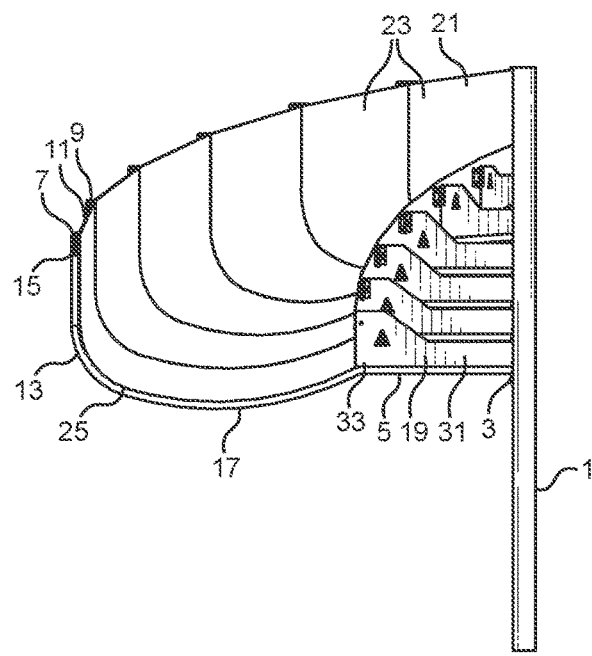
FIG. 2 shows a front view of an embodiment of the present invention.
Figure 3:
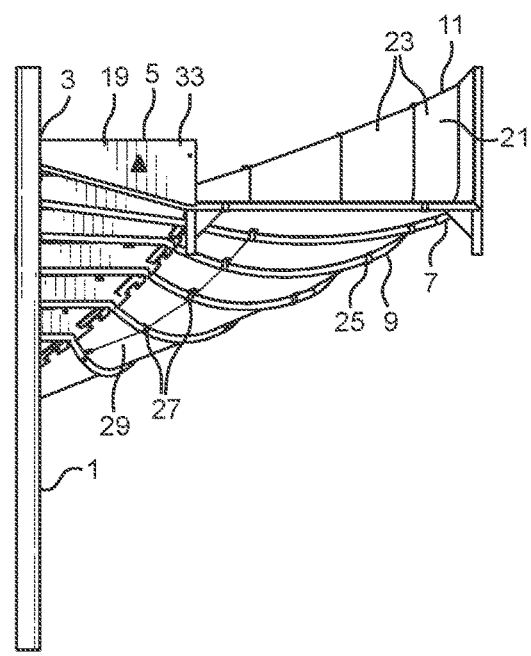
FIG. 3 shows a rear view of an embodiment of the present invention.
Figure 4:
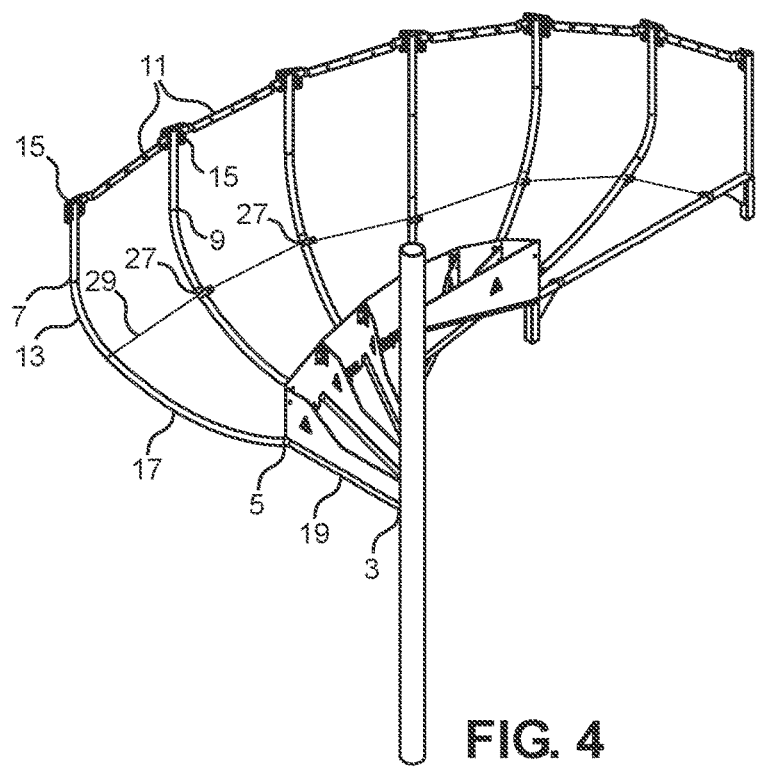
FIG. 4 shows a perspective view of rib assemblies and a stanchion of an embodiment of the present invention.
Figure 5:
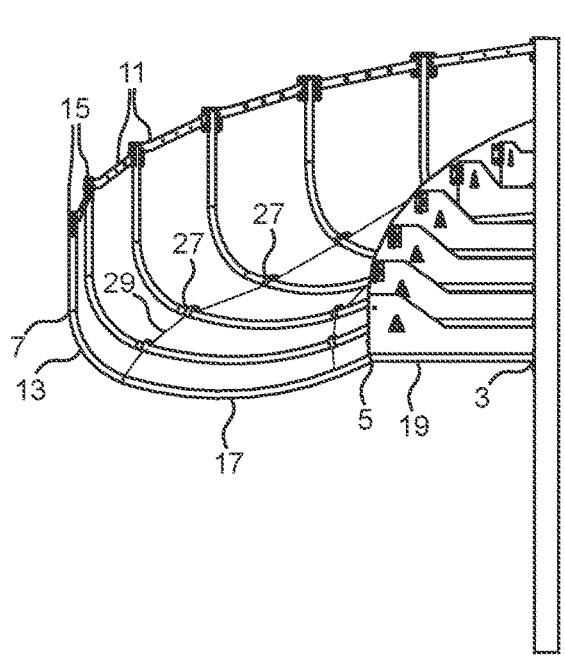
FIG. 5 shows a front view rib assemblies and a stanchion of an embodiment of the present invention.
Figure 6:
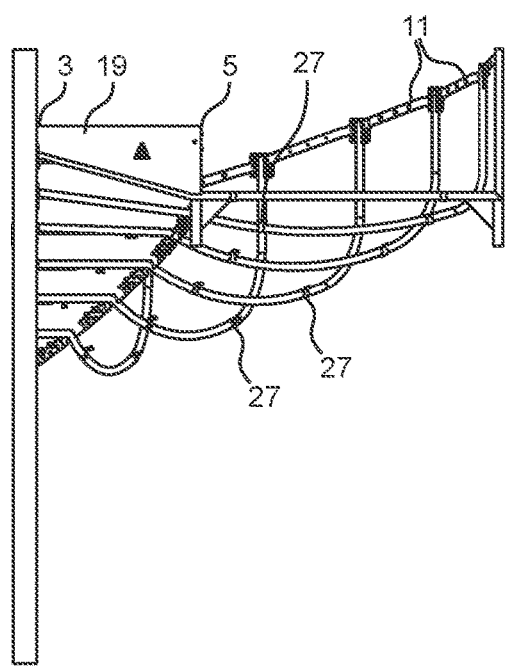
FIG. 6 shows a rear view of rib assemblies and a stanchion of an embodiment of the present invention.
Figure 7:
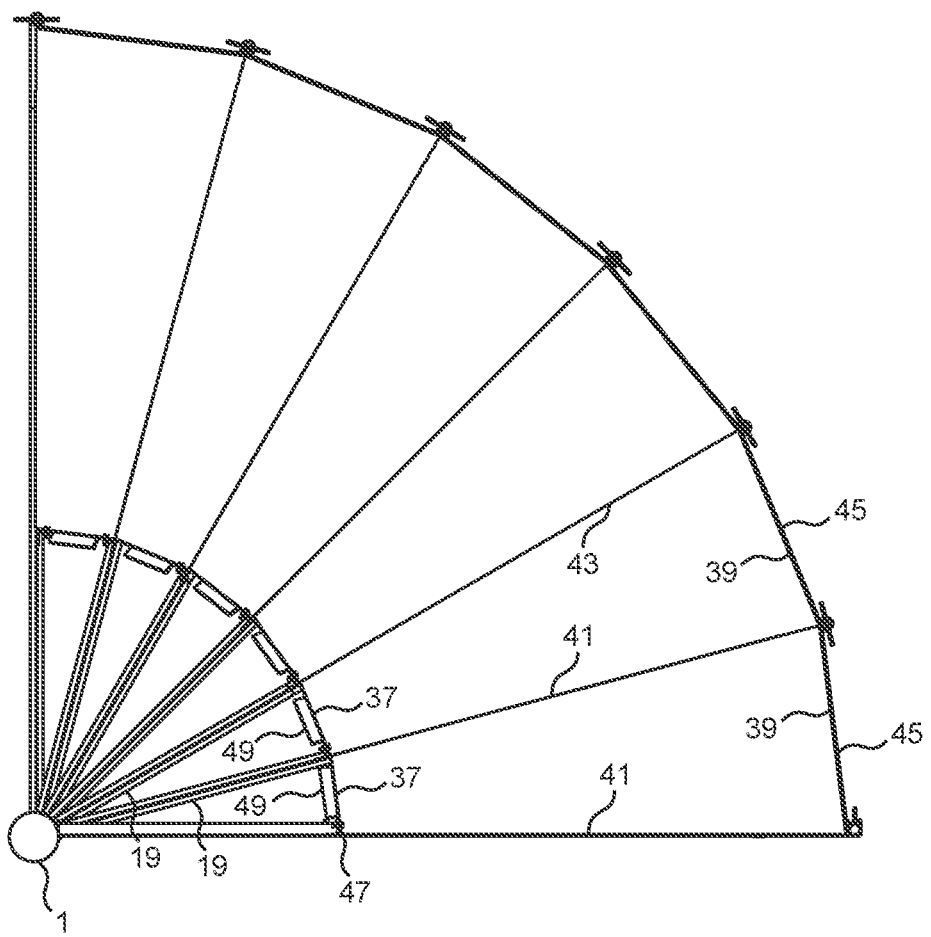
FIG. 7 shows a top view of an embodiment of the present invention.
Figure 8:
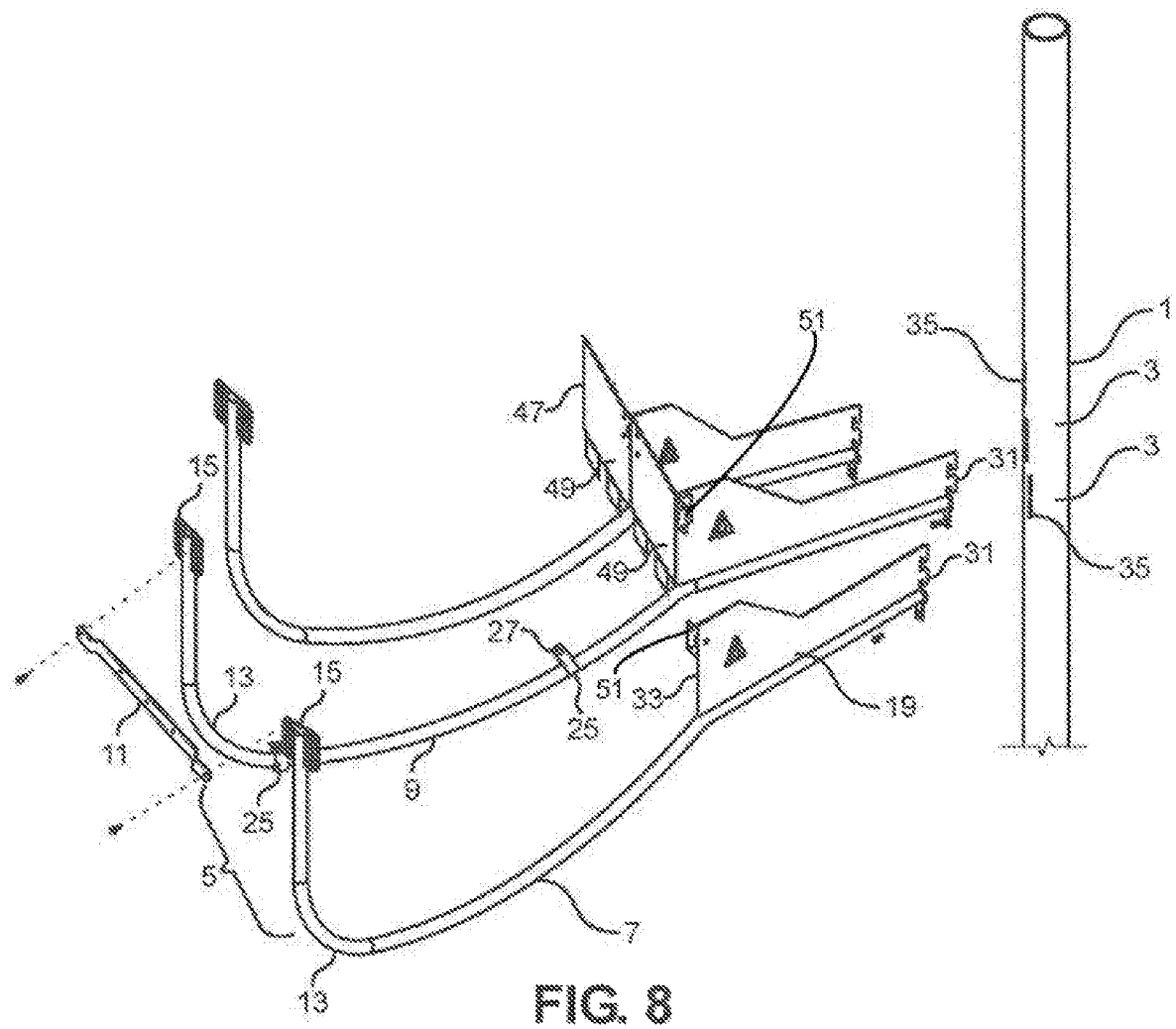
FIG. 8 shows an exploded perspective view of rib assemblies of an embodiment of the present invention.
Figure 9:
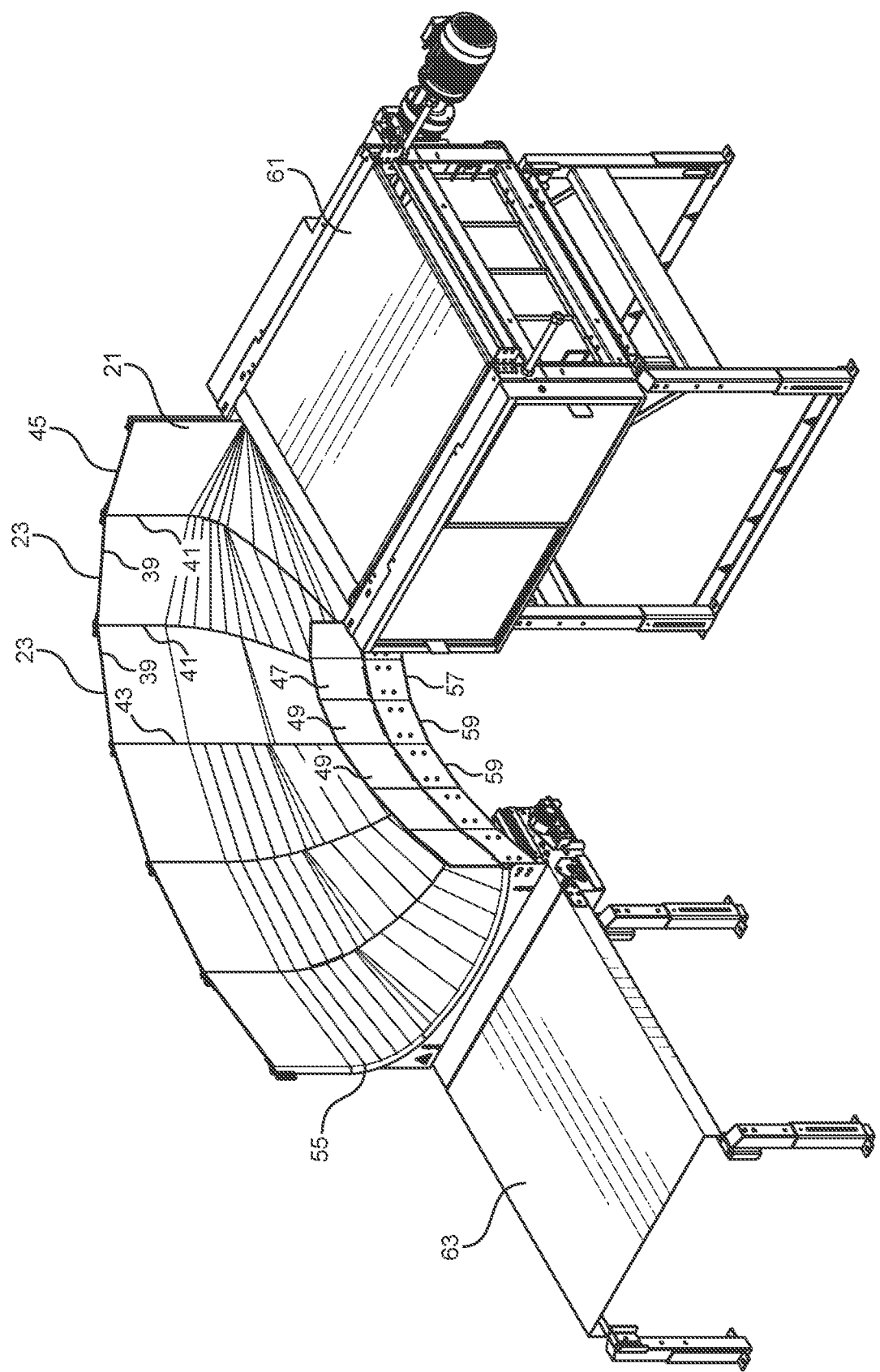
FIG. 9 shows a perspective view of an embodiment of the present invention.
Figure 10:
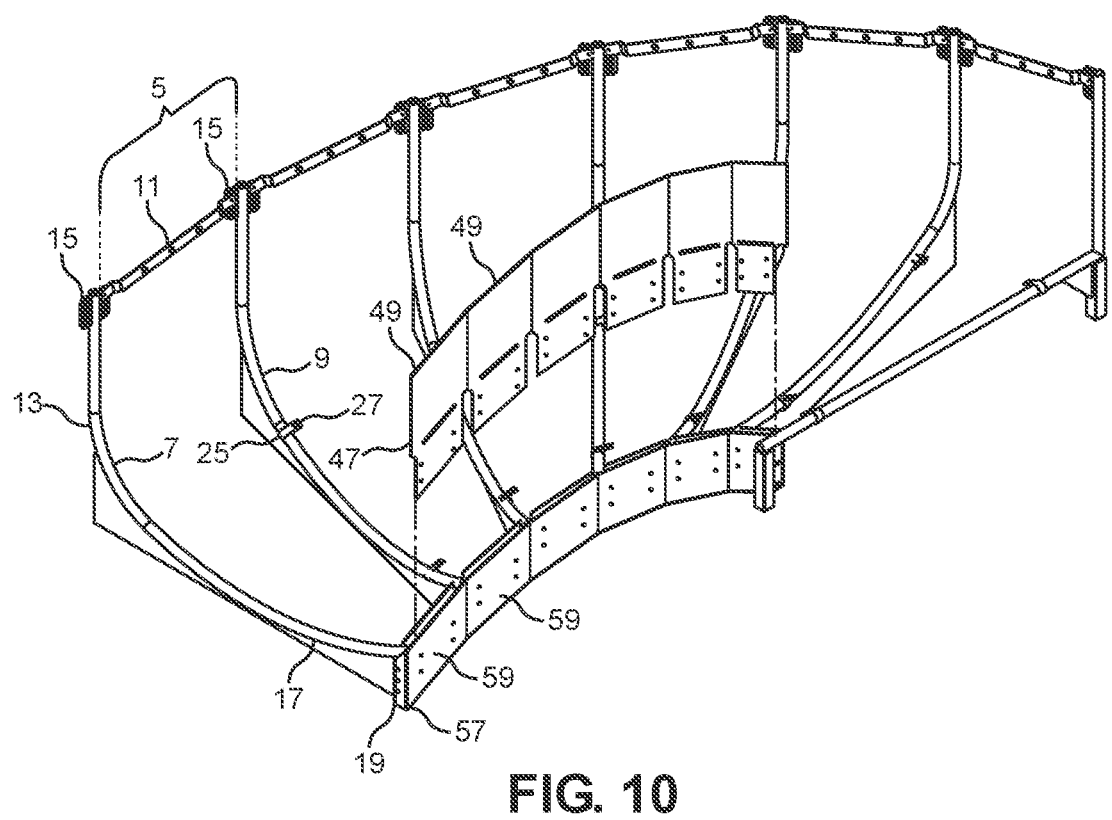
FIG. 10 shows a perspective view of rib assemblies of an embodiment of the present invention.
Figure 11:
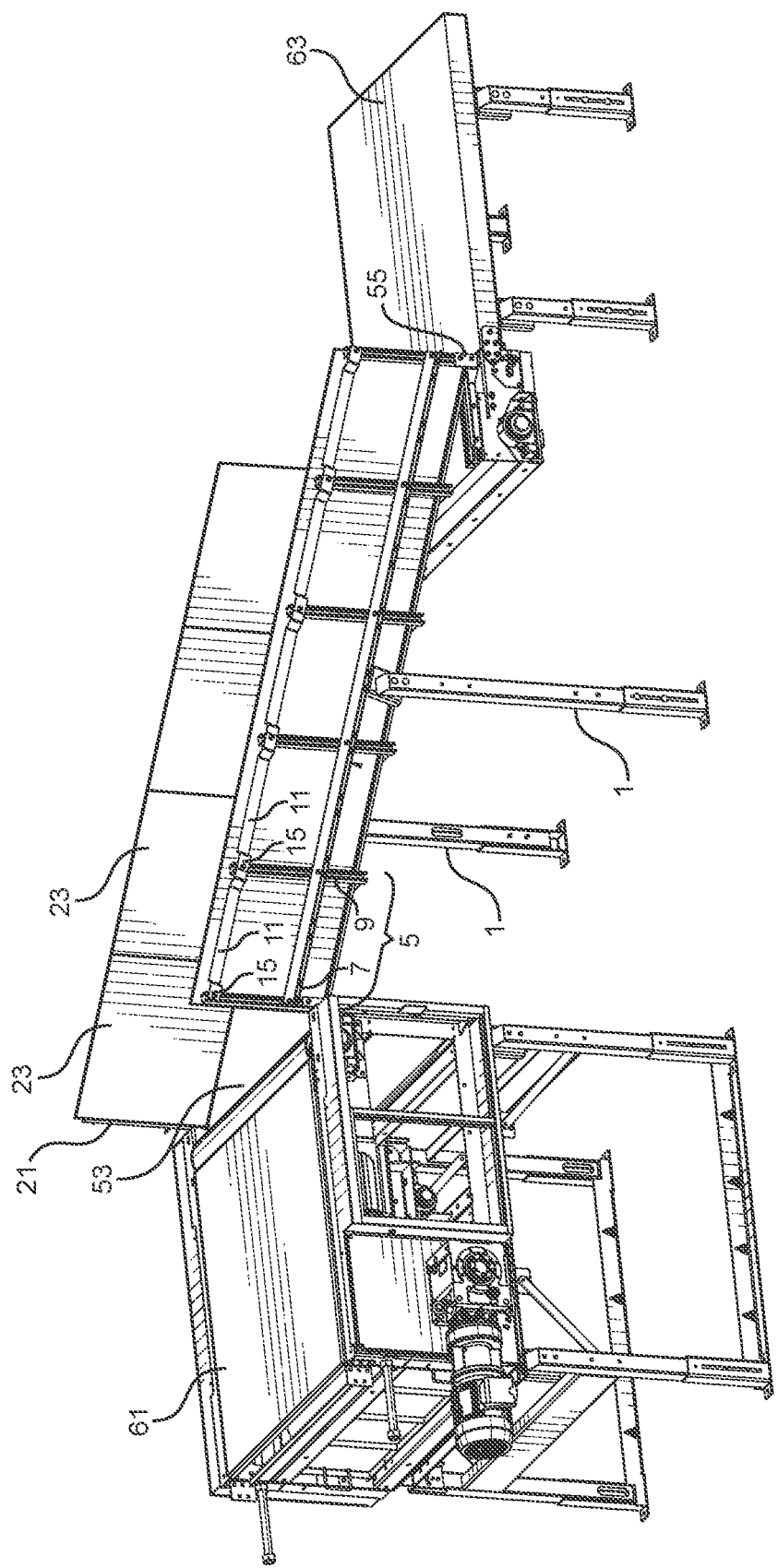
FIG. 11 shows a perspective view of an embodiment of the present invention.
Figure 12:
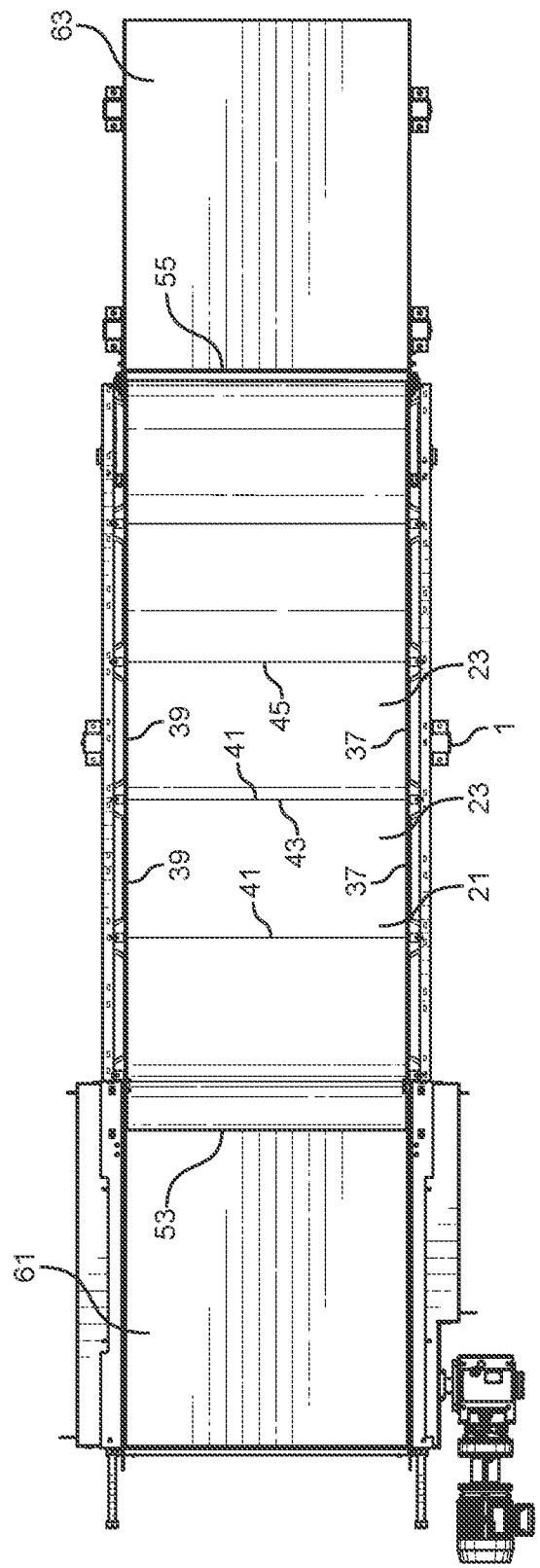
FIG. 12 shows a top view of an embodiment of the present invention.
Figure 13:
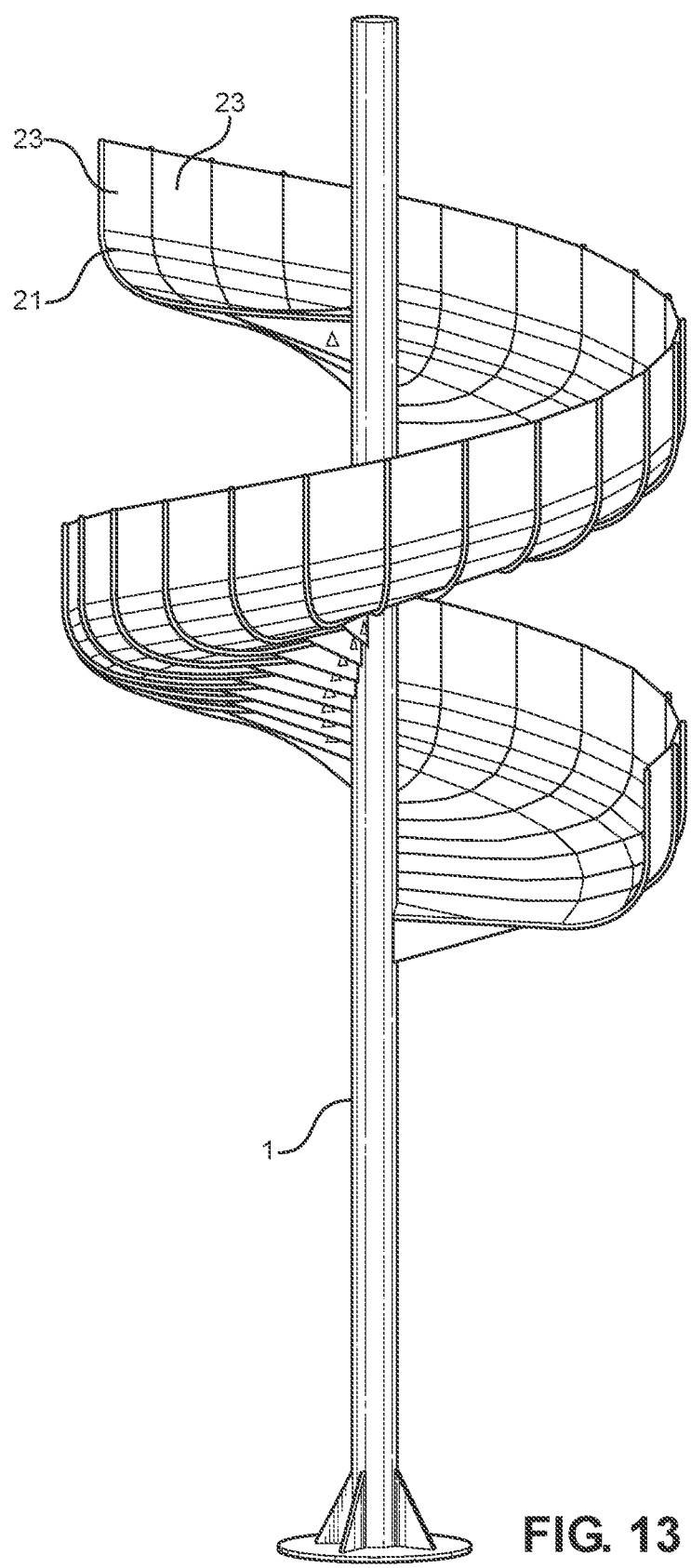
FIG. 13 shows a perspective view of an embodiment of the present invention.

Embodiments of the present invention are directed to an improved modular chute for the transportation of articles.

The chute may be used to transport such articles from a first location to a desired second location. In preferred embodiments of the present invention, the first location is positioned at a selected height above the desired second location and the chute extends from the selected first location to the desired second location. The present invention provides a number of advantages compared to devices known to the prior art. Specifically, embodiments of the present invention provide a chute that is readily assembled and disassembled for timely and cost-efficient shipping and installation of the chute. The chute is also readily repairable and can accommodate easy replacement of any portion or component of the chute. Further, embodiments of the present invention provide an improved modular chute that is readily adaptable to a desired size, slope, shape, and rotational degree.

In a preferred embodiment, the apparatus of the present invention comprises a modular chute comprising a stanchion 1 and a plurality of rib assemblies 5 extending outwardly from the stanchion 1. The stanchion 1 comprises a plurality of rib connection points 3, by which the rib assemblies 5 are removably connectable to the stanchion 1. Each of the rib assemblies 5 comprises at least a first rib 7, a second rib 9, and a tie rod 11, and the tie rod 11 connects the first rib 7 to the second rib 9. Preferred embodiments further comprise a lining 21 disposed within one or more of the rib assemblies 5, wherein the lining 21 comprises a plurality of lining sections 23.

As would be appreciated by one skilled in the art, the stanchion 1 of the present invention may comprise a number of selected shapes, sizes, and materials suitable to support the plurality of rib assemblies 5. In a preferred embodiment, the stanchion 1 is tubular and substantially comprises ultra-high-molecular-weight polyethylene. In alternative embodiments, the stanchion 1 may be cylindrical or polygonal. In further alternative embodiment, the stanchion 1 may comprise other desired polymers or plastics, fiberglass, wood, or metals such as steel or aluminum. The stanchion 1 preferably extends vertically at least as high as a selected first location where articles may be inserted into the chute and further extends at least as low as a desired second location where articles may be discharged from the chute. In alternative embodiments, the stanchion 1 further comprises a base portion. The base portion may optionally comprise a base support member extending outwardly from the base portion and providing structural support and stability to the stanchion 1. In alternative embodiments, the base portion comprises a plurality of base support members extending outwardly from the base portion and providing additional structural support and stability to the stanchion 1.

In certain embodiments, the plurality of rib connection points 3 comprise apertures 35 in the stanchion 1. The apertures 35 optionally comprise a slot in which a portion of the ribs may be removably inserted. As would be appreciated by one skilled in the art, apertures 35 may be formed in the stanchion 1 in a number of ways. Preferably, the apertures 35 are formed by laser cutting. Alternatively, the apertures 35 may be formed by hand drilling or hand cutting.

In a preferred embodiment, each of the ribs comprises a first end portion 13 comprising a tie rod mounting point and a second end portion 17 comprising a connection member 19. The tie rods 11 are removably coupled to each of the first rib 7 and the second rib 9 at the tie rod mounting points 15. In preferred embodiments, the tie rod mounting points 15 are located at a distal end of the rib first end portions 13. In alternative embodiments, the tie rod mounting points 15 may be located at any selected location on the rib first end portions 13. In further alternative embodiments, the rib second end portions 17 may also comprise tie rod mounting points 15 at any selected location. Additional tie rods 11 may be used in certain embodiments to removably couple rib second end portions 17 at the tie rod mounting points 15. As would be appreciated by one skilled in the art, the tie rods 11 may be coupled to the tie rod mounting points 15 by any suitable mechanical means. In preferred embodiments, the tie rods 11 are coupled to the tie rod mounting points 15 by brackets and self-tapping screws. In alternative embodiments, the tie rods 11 may be coupled to the tie rod mounting points 15 by screws, rivets, bolts, nuts, brackets, straps, or any combination thereof. The ribs may comprise any size, shape, and material suitable to support the structure of the chute. In a preferred embodiment, the ribs are tubular and substantially comprise ultra-high-molecular-weight polyethylene. In alternative embodiments, the ribs may be cylindrical or polygonal in shape and may optionally comprise such suitable materials as other desired polymers or plastics, wood, fiberglass, or metals such as steel or aluminum.

In preferred embodiments, the rib connection members 19 comprise an inner end 31 and an outer end. As would be appreciated by one skilled in the art, the connection members 19 may comprise a number of selected shapes, sizes, and materials. In a preferred embodiment, the connection members 19 comprise a vertical panel disposed over the rib second portions and, further, substantially comprise ultra-high-molecular-weight polyethylene. In alternative embodiments, the connection members 19 may optionally comprise such suitable materials as other selected polymers or plastics, wood, fiberglass, or metals such as steel or aluminum. The inner ends 31 may be removably inserted into and secured to the apertures 35 in the stanchion 1. Optionally, the inner ends 31 may further comprise a flange member that is removably inserted into a corresponding slot in the stanchion 1. In certain embodiments, the outer ends 33 provide support to the lining 21 when it is disposed within one or more of the rib assemblies 5.

As would be appreciated by one skilled in the art, the ribs extend outwardly from the stanchion 1 at a length and configuration suitable to support the full width and height of the lining 21. In alternative embodiments, the ribs may support only a selected portion of the lining 21. In preferred embodiments, the rib first end portions 13 extend substantially vertically to accommodate upwardly bent or curved lining sections 23. Likewise, the rib second portions extend substantially horizontally to support the bottom surface of the lining 21. In alternative embodiments, the rib first end portions 13 may extend substantially horizontally to accommodate uniplanar or substantially horizontal lining sections 23.

In a preferred embodiment, the rib assemblies 5 are arranged downwardly in a helical manner to support a helical chute that rotates downwardly around the stanchion 1 to a selected rotational degree. As would be appreciated by one skilled in the art, any rotational degree may be selected for the helically arranged rib assemblies 5 and helical chute to accommodate for the displacement between an article's first location and selected second location. In a preferred embodiment, the ribs and chute rotate approximately 90 degrees around the stanchion 1. In alternative embodiments, the ribs and chute rotate at any selected degree around the stanchion 1. By way of non-limiting example only, the ribs and chute may rotate around the stanchion 1 to a total of approximately 30 degrees, approximately 60 degrees, approximately 180 degrees, approximately 270 degrees, or approximately 360 degrees. Optionally, the ribs and chute may rotate around the stanchion 1 to a total of greater than 360 degrees. As would be appreciated by one skilled in the art, any rotational degree may be selected that is suitable to accommodate a selected size and shape of the chute.

In certain embodiments, the chute optionally comprises a substantially straight linear chute that rotates approximately zero degrees or slightly greater than zero degrees around the stanchion 1. In further additional embodiments, the chute may comprise a helical chute, a linear chute, a u-shaped chute, a v-shaped chute, an outwardly flared chute, a winged chute, an angled chute, or any desired combination thereof. A number of sizes and shapes may be selected for the chute by providing rib assemblies 5 arranged in a manner to support the desired size and shape of the chute.

In preferred embodiments of the present invention, the chute further comprises an inner radius guard 47 arranged around the stanchion 1 and corresponding to the rib assemblies 5 and chute lining 21. The inner radius guard 47 comprises a plurality of guard sections 49. As would be appreciated by one skilled in the art, the guard sections 49 may comprise a number of selected shapes, sizes, and materials. In a preferred embodiment, the guard sections 49 are substantially rectangular in shape and substantially comprise ultra-high-molecular-weight polyethylene. The ultra-high-molecular-weight polyethylene of preferred guard sections 49 comprises DuraSurf™ Silicon Treated Surface. In alternative embodiments, the ultra-high-molecular-weight polyethylene of guard sections 49 comprises Tivar® 1000 ESD, Tivar® Dry Slide, SIMONA® Low Friction PE, or King Hy-Pact®. In further alternative embodiments, the guard sections 49 may comprise such suitable materials as other selected polymers or plastics, wood, fiberglass, or metals such as steel or aluminum.

Each of the guard sections 49 is removably coupled to at least one of the connection member outer ends 33. Further, each of the plurality of lining sections 23 is removably coupled to at least one of the guard sections 49. In certain embodiments, the guard sections 49 may comprise an opening, such as a slot. The lining sections 23 may further comprise a flange member that is removably inserted into the guard section opening. Preferably, the guard sections 49 are removably coupled to the connection member outer ends 33 by at least a hinge member. In alternative embodiments, the guard sections 49 may be removably coupled to the connection member outer ends 33 by a plurality of hinge members 51. As would be appreciated by one skilled in the art, the hinge members 51 may be removably coupled to the guard section by any suitable mechanical means. In preferred embodiments, the hinge members 51 are removably coupled to the guard section by screws. In alternative embodiments, the hinge members 51 are removably coupled to the guard section by screws, rivets, bolts, nuts, brackets, straps, or any combination thereof. Connecting the guard sections 49 to the connection member outer ends 33 with hinge members 51 allows for adjustments in the selected total degree of rotation for the inner radius guard 47 and the corresponding lining sections 23, thus providing a chute that is readily adaptable to a desired size and shape. In alternative embodiments, the guard sections 49 are removably coupled to the connection member outer ends 33 by a hinge, bracket, strap, screws, rivets, bolts, nuts, or any combination thereof.

In alternative embodiments, the modular chute of the present invention is not supported by a stanchion 1. Such alternative embodiments comprise an infeed mounting portion 53 and a discharge mounting portion 55 to provide structural support to the chute. Optionally, embodiments may comprise one or more stanchions for structural support, in addition to an infeed mounting portion 53 and a discharge mounting portion 55. The infeed mounting portion 53 is removably coupled to an infeed unit 61, such as a conveying surface, which is used to feed articles into the chute for transportation. The discharge mounting portion 55 is removably coupled to a discharge unit 63, such as a conveying surface, table, or bin, which is the desired discharge location for articles exiting the chute. As would be appreciated by one skilled in the art, the infeed mounting portion 53 may be removably coupled to the infeed unit 61 by any suitable mechanical means, such as by screws, rivets, bolts, nuts, brackets, straps, or any combination thereof. Likewise, the discharge mounting portion 55 may be removably coupled to the discharge unit 63 by any such suitable mechanical means. When assembled, the chute is structurally supported by both the infeed unit 61 and the discharge unit 63.

Alternative embodiments of the present invention further comprise the inner radius guard 47 removably coupled to an inner radius support 57, which provides additional structural support to the chute. In order to structurally support the chute, the inner radius support 57 is removably coupled to the infeed mounting portion 53 at the inner radius upper end and further removably coupled to the discharge mounting portion 55 at the inner radius lower end. The inner radius support 57 comprises a plurality of support sections 59 corresponding to the plurality of guard sections 49. Further, each of the support sections 59 is removably coupled to at least one rib connection member 19, and each of the guard sections 49 is removably coupled to at least one of the support sections 59. As would be appreciated by one skilled in the art, the guard sections 49 may be removably coupled to the support sections 59 by any suitable mechanical means, such as by screws, rivets, bolts, nuts, brackets, straps, or any combination thereof.

In alternative embodiments, the support sections 59 are removably coupled to the rib connection members 19 by at least a hinge member. Optionally, the support sections 59 may be removably coupled to the connection members 19 by a plurality of hinge members 51. As would be appreciated by one skilled in the art, the hinge members 51 may be removably coupled to the support section by any suitable mechanical means. In preferred embodiments, the hinge members 51 are removably coupled to the support section by screws. In alternative embodiments, the hinge members 51 are removably coupled to the support section by screws, rivets, bolts, nuts, brackets, straps, or any combination thereof. Connecting the support sections 59 to the connection members 19 with hinge members 51 allows for adjustments in the selected total degree of rotation for the inner radius support 57 and the corresponding inner radius guard 47, as well as the corresponding lining sections 23, thus providing a chute that is readily adaptable to a desired size and shape. Optionally, the support sections 59 are removably coupled to the connection members 19 by a hinge, bracket, strap, screws, rivets, bolts, nuts, or any combination thereof.

In further alternative embodiments, the support sections 59 are coupled to each other by at least a hinge member, further allowing for adjustments in the selected total degree of rotation for the inner radius support 57 and corresponding inner radius guard 47, thus providing a chute that is readily adaptable to a desired size and shape. In such embodiments, the rib connection points 3 may be removably coupled to the hinge members 51 by any suitable mechanical means, such as by screws, rivets, bolts, nuts, brackets, straps, or any combination thereof. Alternatively, the support members 25 may comprise apertures 35 or slots, into which the rib connection members 19 may be removably inserted. Such embodiments may optionally further comprise a locking member, such as a pin, to secure the rib connection members 19 to the support members 25.

The support sections 59 may comprise a number of selected shapes, sizes, and materials. In certain embodiment, the support sections 59 are substantially rectangular in shape and substantially comprise ultra-high-molecular-weight polyethylene. Preferably, the support sections 59 are substantially the same size and shape as the corresponding guard sections 49. The ultra-high-molecular-weight polyethylene of preferred support sections 59 comprises DuraSurf™ Silicon Treated Surface. In other embodiments, the ultra-high-molecular-weight polyethylene of support sections 59 comprises Tivar® 1000 ESD, Tivar® Dry Slide, SIMONA® Low Friction PE, or King Hy-Pact®. In further alternative embodiments, the support sections 59 may comprise such suitable materials as other selected polymers or plastics, wood, fiberglass, or metals such as steel or aluminum.

In preferred embodiments, each of the lining sections 23 comprises an inner edge, an outer edge, an upper edge, and a lower edge. Each of these edges defines a shape for each lining section. As would be appreciated by one skilled in the art, the lining sections 23 may comprise a number of selected shapes, sizes, and materials. In a preferred embodiment, the lining sections 23 substantially comprise ultra-high-molecular-weight polyethylene. The ultra-high-molecular-weight polyethylene of preferred lining sections 23 comprises DuraSurf™ Silicon Treated Surface. In alternative embodiments, the ultra-high-molecular-weight polyethylene of lining sections 23 comprises Tivar® 1000 ESD, Tivar® Dry Slide, SIMONA® Low Friction PE, or King Hy-Pact®. Further, in preferred embodiments, the shape defined by the lining section edges is trapezoidal, whereby the inner edge 37 is substantially equidistant from the outer edge 39 and the upper edge 41 and the lower edge 43 diverge from each other in a direction from the inner edge 37 to the outer edge. In alternative embodiments, shape defined by the lining section edges may comprise any number of selected sizes and shapes suitable to form the chute lining 21 such as circular, elliptical, triangular, rectangular, or any selected polygonal shape.

In preferred embodiments, each of the lining section inner edges 37 extends substantially horizontally from at least one of the guard sections 49. Further, each of the outer edges 39 extends substantially vertically, thereby forming an outer radius wall 45. Alternatively, the outer edges 39 may extend upwardly at any selected angle. In further alternative embodiments, the outer edges 39 may extend substantially horizontally to provide uniplanar or substantially horizontal lining sections 23. As would be appreciated by one skilled in the art, the outer radius wall 45 and the inner radius guard 47 decrease the risk of an article falling off either side of the chute as it is being transported down the chute.

Except for the uppermost lining section, each of the lining section upper edges 41 is disposed under and removably coupled to an adjacent lining section's lower edge. This configuration of lining sections 23 accommodates a downward slope for any selected size and shape of chute as described herein. In certain embodiments, the upper edge 41 of the uppermost lining section further comprises a lip portion. The lip portion may comprise any selected size and shape suitable to facilitate the insertion of articles into the chute. In preferred embodiments, the lip portion corresponds to a conveying surface, wherein the conveying surface inserts articles into the chute via the lip portion. In alternative embodiments, the lip portion may facilitate the insertion of articles into the chute by hand or by any other selected suitable mechanical means.

As would be appreciated by one skilled in the art, the lining sections 23 may be removably coupled by any suitable mechanical means. In preferred embodiments, the lining section upper edges 41 and lower edges 43 are removably coupled by a strap coupled to any selected rib portion and further coupled to both lining section edges by a self-tapping screw. In alternative embodiments, the lining section upper edges 41 and lower edges 43 may be removably coupled by screws, rivets, bolts, nuts, brackets, straps, or any combination thereof. Further, the downward slope of the lining sections 23 may be adjusted by altering the rib assemblies 5, whereby a greater height displacement between the first rib 7 and the second rib 9 of each rib assembly results in a steeper slope for the lining 21. The displacement of the rib assemblies 5 may be readily adjusted by moving the rib connection points 3 to any desired heights on the stanchion 1. Any desired downward slope between zero and ninety degrees may be selected for the chute lining 21. By way of non-limiting example only, a selected lining 21 slope may be approximately 15 degrees, approximately 30 degrees, or approximately 45 degrees. As would be appreciated by one skilled in the art, a steeper lining 21 slope would result in faster transportation of an article down the chute, whereas a shallower lining 21 slope would result in slower transportation of an article down the chute.

In certain embodiments, the chute further comprises a support member 25 that connects the rib first end portions 13 to the second end portions 17. The support member 25 may comprise a number of mechanical connection means, such as screws, bolts, nuts, rivets, brackets, straps, and the like. Optionally, the support member 25 further comprises at least a first guidewire receiving member 27, such as a hook or a loop. An embodiment of the present invention may comprise a support wire 29 attached to each of the first guidewire receiving members 27. Preferably, the support wire 29 is arranged along the entire length of the chute lining 21 and tightened to provide additional structural support and stability to the chute. In alternative embodiments, the support wire 29 may be arranged along any selected length of the chute lining 21 and tightened to provide additional structural support and stability to the chute. In further alternative embodiments, the chute may comprise a plurality of guidewire receiving members 27 on the ribs and further comprise a support wire 29 attached to each of the plurality of guidewire receiving members 27. Each of the support wires 29 may optionally be arranged along the entire length of the chute lining 21 or arranged along any selected length of the chute lining 21, as desired to provide additional structural support and stability to the chute. Preferably, support wires 29 comprise steel cables. Alternatively, support wires 29 may comprise ropes, cords, or cables, or any combination thereof, comprising steel, nylon, polyester, polypropylene, or fibrous materials that are suitable to provide additional structural support and stability to the chute.

In use, embodiments of the present invention are readily adaptable for the transportation of a variety of sizes and shapes articles. The chute may is used to transport such articles from a first location to a desired second location, wherein the first location is positioned at a height above the desired second location. The speed with which the articles are transported may vary by altering the slope of the chute lining 21 as described herein. Embodiments of the present invention further provide a chute that is readily assembled and disassembled for timely and cost-efficient shipping and installation of the chute. Each of the ribs, lining sections 23, guard sections 49, and tie rods 11 may be readily disassembled and assembled. As such, in use, the entire chute may be transported and shipped completely disassembled. The complete chute may then be readily assembled at the desired destination in any number of sizes and configurations. The chute is readily modifiable to any number of selected sizes and shapes by adding, removing, or adjusting components, as described herein, such as ribs, lining sections 23, guard sections 49, and guidewires. Additionally, the chute is readily repairable and can accommodate easy replacement of any portion of the chute, such as the stanchion 1, ribs, lining sections 23, guard sections 49, tie rods 11, and guidewires. Further, in use, embodiments of the present invention provide a modular chute that is readily adaptable to a desired overall size and readily configured to any desired shape and rotational degree, as described herein.

Although the present invention has been described in considerable detail with reference to certain preferred versions thereof, other versions are possible. For example, materials, shapes, sized, or configurations other than those described in detail herein may be used for the versions of this invention. Therefore, the spirit and scope of the claims should not be limited to the description of the preferred versions described herein.

The invention claimed is:

1. A modular chute for the transport of articles comprising:
    (a) a stanchion comprising a plurality of rib connection points;
    (b) a plurality of rib assemblies extending from the stanchion, each of said rib assemblies comprising at least a first rib; a second rib, and a tie rod connecting said first rib to said second rib, and wherein each of said ribs comprises:
        (i) a first end portion comprising a tie rod mounting point,
        (ii) a second end portion comprising a connection member,
        (iii) a support member connecting said first end portion to said second end portion and comprising at least a first guidewire receiving member; and
    (c) a lining disposed within one or more of said rib assemblies, wherein said lining comprises a plurality of lining sections.

2. The modular chute of claim 1, further comprising a support wire attached to each of said first guidewire receiving members.

3. The modular chute of claim 1, wherein each of said connection members comprises an inner end and an outer end.

4. The modular chute of claim 3, wherein said rib connection points comprise apertures in said stanchion, and wherein said inner ends are removably inserted into said apertures.

5. The modular chute of claim 4, wherein each of said lining sections comprises an inner edge, an outer edge, an upper edge, and a lower edge, and wherein each of said edges defines a shape for each lining section.

6. The modular chute of claim 5, wherein the shape defined by said edges is rectangular, thereby forming a substantially linear chute.

7. The modular chute of claim 5, wherein the shape defined by said edges is trapezoidal, wherein said inner edge is substantially equidistant from said outer edge and said upper edge and said lower edge diverge from each other in a direction from said inner edge to said outer edge, thereby forming a spiraling chute.

8. The modular chute of claim 5, wherein each of said inner edges extends substantially horizontally from said stanchion, and wherein each of said outer edges extends substantially vertically to at least one of said tie rods, thereby forming an outer radius wall.

9. The modular chute of claim 5, further comprising an inner radius guard, wherein said inner radius guard comprises a plurality of guard sections.

10. The modular chute of claim 9, wherein each of said guard sections is removably coupled to at least one of said outer ends by at least a hinge member.

11. The modular chute of claim 10, wherein each of said lining sections is removably coupled to at least one of said guard sections.

12. The modular chute of claim 11, wherein each of said guard sections comprises ultra-high-molecular-weight polyethylene.

13. The modular chute of claim 1, wherein each of said ribs comprises ultra-high-molecular-weight polyethylene.

14. The modular chute of claim 13, wherein each of said ribs is tubular.

15. The modular chute of claim 1, wherein said lining comprises ultra-high-molecular-weight polyethylene.

16. The modular chute of claim 1, wherein said stanchion comprises ultra-high-molecular-weight polyethylene.

17. A modular chute for the transport of articles comprising:
    (a) an infeed mounting portion and a discharge mounting portion;
    (b) a plurality of rib assemblies disposed between said infeed mounting portion and said discharge mounting portion, each of said rib assemblies comprising at least a first rib; a second rib, and a tie rod connecting said first rib to said second rib, and wherein each of said ribs comprises:
        (i) a first end portion comprising a tie rod mounting point and
        (ii) a second end portion comprising a connection member;
    (c) a lining disposed within one or more of said rib assemblies, wherein said lining comprises a plurality of lining sections; and
    (d) an inner radius guard and an inner radius support, wherein said inner radius support comprises a plurality of support sections and said inner radius guard comprises a plurality of guard sections, wherein each of said support sections is removably coupled to at least one connection member, and wherein each of said guard sections is removably coupled to at least one of said support sections.

18. The modular chute of claim 17, wherein each of said lining sections is removably coupled to at least one of said guard sections.

19. The modular chute of claim 17, wherein said infeed mounting portion is removably coupled to an infeed unit.

20. The modular chute of claim 19, wherein said discharge mounting portion is removably coupled to a discharge unit.

21. The modular chute of claim 17, further comprising a support member connecting said first end portion to said second end portion.

22. The modular chute of claim 21, wherein said support member comprises at least a first guidewire receiving member.

23. The modular chute of claim 22, further comprising a support wire attached to each of said first guidewire receiving members.

24. The modular chute of claim 20, wherein each of said lining sections comprises an inner edge, an outer edge, an upper edge, and a lower edge, and wherein each of said edges defines a shape for each lining section.

25. The modular chute of claim 24, wherein the shape defined by said edges is rectangular, thereby forming a substantially linear chute.

26. The modular chute of claim 25, wherein the shape defined by said edges is trapezoidal, wherein said inner edge is substantially equidistant from said outer edge and said upper edge and said lower edge diverge from each other in a direction from said inner edge to said outer edge, thereby forming a spiraling chute.

27. The modular chute of claim 24, wherein each of said inner edges extends substantially horizontally from said stanchion, and wherein each of said outer edges extends substantially vertically to at least one of said tie rods, thereby forming an outer radius wall.

* * * * *